(12) United States Patent
Williams

(10) Patent No.: US 7,986,916 B2
(45) Date of Patent: Jul. 26, 2011

(54) DEMODULATION COMMUNICATION SIGNALS IN A NEAR FIELD RADIO FREQUENCY (RF) COMMUNICATOR

(75) Inventor: Andrew Williams, Gloucester (GB)

(73) Assignee: Innovision Research & Technology PLC, Gloucestershire (GB)

( * ) Notice: Subject to any disclaimer, the term of this patent is extended or adjusted under 35 U.S.C. 154(b) by 700 days.

(21) Appl. No.: 11/920,788

(22) PCT Filed: May 22, 2006

(86) PCT No.: PCT/GB2006/001865
§ 371 (c)(1),
(2), (4) Date: Nov. 20, 2007

(87) PCT Pub. No.: WO2006/123170
PCT Pub. Date: Nov. 23, 2006

(65) Prior Publication Data
US 2009/0137219 A1    May 28, 2009

(30) Foreign Application Priority Data

May 20, 2005 (GB) .................................. 0510358.5
Jul. 6, 2005 (GB) .................................. 0513870.6
Jul. 6, 2005 (GB) .................................. 0513871.4

(51) Int. Cl.
*H04B 5/00* (2006.01)
*H04K 3/00* (2006.01)
(52) U.S. Cl. ..................... 455/41.1; 340/854.8; 379/55.1
(58) Field of Classification Search ................. 455/41.1; 340/854.8; 375/258; 379/55.1
See application file for complete search history.

(56) References Cited

U.S. PATENT DOCUMENTS

| 4,968,970 A * | 11/1990 | LaPorte | 375/133 |
| 5,815,020 A | 9/1998 | Allen et al. | |
| 2003/0128070 A1 | 7/2003 | Rizzo et al. | |

FOREIGN PATENT DOCUMENTS

FR    2 623 311 A    5/1989

* cited by examiner

*Primary Examiner* — Lee Nguyen
(74) *Attorney, Agent, or Firm* — Sterne, Kessler, Goldstein & Fox P.L.L.C.

(57) ABSTRACT

A near field RF communicator has an IQ demodulator and a demodulator processor that identifies a transition between logical states on the basis of either: 1) a magnitude obtained by adding a first value representing a difference between positive and negative peaks in the in-phase modulation and a second value representing a difference between positive and negative peaks in the quadrature phase modulation; or 2) whether a combined value representing a rate of change in the in-phase modulation and in the quadrature phase modulation exceeds a threshold.

24 Claims, 8 Drawing Sheets

DEMODULATION COMMUNICATION SIGNALS IN A NEAR FIELD RADIO FREQUENCY (RF) COMMUNICATOR

Near field radio frequency (RF) communication requires an antenna of one near field RF communicator to be present within the alternating magnetic field (H field) generated by the antenna of another near field RF communicator by transmission of an RF signal (for example a 13.56 Mega Hertz signal) to enable the magnetic field (H field) of the RF signal to be inductively coupled between the communicators. The RF signal may be modulated to enable communication of control and/or other data. Ranges of up to several centimeters (generally a maximum of 1 meter) are common for near field RF communicators.

Near field RF communication may be referred to as near-field RFID (Radio Frequency Identification) or near-field communication (NFC). NFC communicators are a type of near field RF communicator that is capable of both initiating a near field RF communication (through transmission or generation of an alternating magnetic field) with another near field RF communicator and of responding to initiation of a near field RF communication by another near field RF communicator. Hence NFC communicators can act as both transceivers and transponders and are able to communicate with other NFC communicators, RFID transceivers and RFID transponders. The term "near field RF communicator" includes not only NFC communicators but also initiating near field RF communicators such as RFID transceivers or readers that are capable of initiating a near field RF communication but not responding to initiation of a near field RF communication by another near field RF communicator and responding near field RF communicators such as RFID transponders or tags that are capable of responding to initiation of a near field RF communication by another near field RF communicator but not of initiating a near field RF communication with another near field RF communicator.

Examples of near field RF communicators are defined in various standards for example ISO/IEC 18092 and ISO/IEC 21481 for NFC communicators, and ISO/IEC 14443 and ISO/IEC 15693 for near field RF communicators.

It is of course necessary for a near field RF communicator receiving a modulated signal (a "receiving near field RF communicator") from another near field RF communicator (a "sending near field RF communicator") to demodulate an incoming modulated signal to extract the data or information carried by the signal. The signal received by the receiving near field RF communicator will depend upon the physical and electrical characteristics of the communicating near field RF communicators and their environment during operation. The physical and electrical characteristics of a near field RF communicator may vary depending upon, for example, whether the near field RF communicator is a standalone device or is incorporated within or associated with a host or a larger device and, if so, on the physical and electrical characteristics of the host. Examples of such larger devices or host devices are, for example, cellular telephone devices, portable computing devices (such as personal digital assistants, notebooks, lap-tops), other computing devices such as personal or desk top computers, computer peripherals such as printers, or other electrical devices such as portable audio and/or video players such as MP3 players, IPODs®, CD players, DVD players. Other examples of such larger devices or host devices are other electrical or electronic products, for example consumer products such as domestic appliance or personal care products, and other electrical or electronic devices, apparatus or systems. Some areas of application are payment systems, ticketing systems, for example in tickets (for example parking tickets, bus tickets, train tickets or entrance permits or tickets) or in ticket checking systems, toys, games, posters, packaging, advertising material, product inventory checking systems and so on. In addition the physical and electrical characteristics of the location within which the near field RF communicators are located during communication may vary considerably.

The producer or manufacturer of a near field RF communicator may not know the physical and electrical characteristics of the environment within which the near field RF communicator is to operate and so will need to produce near field RF communicators that can cope with an environment with varying physical and electrical characteristics. Indeed, even if the manufacturer knows precisely the environment within which the near field RF communicators are to operate which is unlikely, he will not, for cost reasons, want to produce different near field RF communicators for different environments unless absolutely necessary.

In order to cope with such varying physical and electrical conditions it is of course desirable to obtain the best overall demodulation signal. In areas other than near field PF communication, one way of doing this is to use an IQ demodulator or synchronous demodulator and to use or combine the demodulation information from both the in-phase and quadrature phase (90 degrees out-of-phase) demodulation signals. However, the methods implemented to use or combine the demodulation information from both the in-phase and the quadrature (90 degrees out-of-phase) demodulation signals of an IQ demodulator tend to be both complex and costly. This makes these methods unsuitable for use in the near field RF communications area because, as will be appreciated from the above list of environments within which near field RF communicators may be used, in many cases near field RF communicators need to be both small and cheap to produce.

In one aspect, the present invention provides a near field RF communicator having an IQ demodulator operable to determine-whether a sample modulation level represents a first or a second logical state on the basis of a magnitude obtained by adding a first value representing a difference between positive and negative peaks in the in-phase modulation and a second value representing a difference between positive and negative peaks in the quadrature phase modulation.

In another aspect, the present invention provides a near field RF communicator having an IQ demodulator operable to determine whether a sample modulation level represents a first or a second logical state by determining whether a combined value representing a rate of change in the in-phase modulation and in the quadrature phase modulation exceeds a threshold.

In another aspect, the present invention provides a near field RF communicator comprising:

a coupler operable to couple inductively with the magnetic field of a radio frequency signal to enable a modulated radio frequency signal to be inductively coupled between near field communicators, wherein a modulation envelope of the modulated radio frequency signal has different modulation levels representing different data logic states;

a signal generator operable to supply a radio frequency signal;

a demodulator operable to receive a modulated radio frequency signal inductively coupled to the coupler and to extract data represented by the modulation envelope from such a modulated radio frequency signal, wherein the demodulator comprises a first multiplier operable to multiply the received modulated radio frequency signal by a first radio frequency signal supplied by the signal supplier to produce an in-phase modulated signal, and a second multiplier operable to multiply the received modulated radio frequency signal by a second radio frequency signal in phase quadrature with the first radio frequency signal to produce a quadrature-phase modulated signal; and a demodulator processor comprising a first peak detector coupled to receive in-phase modulation derived from an in-phase modulated signal supplied by the first multiplier and operable to detect negative and positive peaks in the in-phase modulated signal, a second peak detector coupled to receive quadrature-phase modulation derived from a quadrature-phase modulated signal supplied by the first multiplier and operable to detect negative and positive peaks in the quadrature-phase modulated signal, a first difference calculator operable to determine a first difference between negative and positive peaks detected by the first peak detector, a second difference calculator operable to determine a second difference between negative and positive peaks detected by the second peak detector, a combiner operable to determine the length of a vector representing the difference between the negative and positive peaks by adding the first and second differences, and a controller operable to determine whether or not a logic state transition has occurred on the basis of the length of the vector determined by the combiner and so to enable the data to be extracted from the received modulated RF signal.

In another aspect, the present invention provides a near field RF communicator comprising:

a coupler operable to couple inductively with the magnetic field of a radio frequency signal to enable a modulated radio frequency signal to be inductively coupled between near field communicators, wherein a modulation envelope of the modulated radio frequency signal has different modulation levels representing different data logic states;

a signal generator operable to supply a radio frequency signal;

a demodulator operable to receive a modulated radio frequency signal inductively coupled to the coupler and to extract data represented by the modulation envelope from such a modulated radio frequency signal, wherein the demodulator comprises a first multiplier operable to multiply the received modulated radio frequency signal by a first radio frequency signal supplied by the signal supplier to produce an in-phase modulated signal, and a second multiplier operable to multiply the received modulated radio frequency signal by a second radio frequency signal in phase quadrature with the first radio frequency signal to produce a quadrature-phase modulated signal; and a demodulator processor comprising a rate of change determiner operable to receive in-phase and quadrature phase modulated signals and to determine a combined rate of change on the basis of the in-phase and quadrature phase modulated signals, and a determiner operable to compare the combined rate of change with at least one threshold to determine whether or not a logic transition has occurred.

In an embodiment, a near field RF communicator has a demodulator that can be of small physical size and low cost that enables in-phase and quadrature modulation signals to be analyzed to extract the modulation accurately, thereby providing a demodulated signal of sufficient quality.

In an embodiment, a near field RF communicator has a demodulator that calculates the hypotenuse of a right-angled triangle by adding together data relating to the lengths of the other two sides. The shortest side may be multiplied by a correction factor to reduce the side length, thereby increasing accuracy.

In an embodiment, a near field RF communicator uses rate of change information from in-phase and quadrature modulation signals to recover the modulation.

In an embodiment, a near field RF communicator uses rate of change information from in-phase and quadrature modulation signals and combines them in a manner that addresses demodulation difficulties resulting from slowly varying signal levels, small modulation depths and low field strengths caused by relative physical positions and movement between the communicating near field RF communicators, the type of near field RF communicator and the protocol(s) under which the near field RF communicator is operating.

In an embodiment, a near field RF communicator uses rate of change information from the two demodulated signals from an IQ demodulator and combines them in such a manner that a demodulated signal of sufficient quality can be produced in a near field RF communicator of acceptably low physical size and low cost.

In an embodiment, a near field RF communicator has a demodulator that includes analogue I and Q mixers, analogue filters, ADC (analogue to digital converter) circuits and a digital processing circuit. The digital processing circuit is preferably a DSP (digital signal processor) but other digital processors could be used such as, for example, a microprocessor, a microcontroller, a reduced instruction-set computer, or a state-machine.

Embodiments of the present invention will now be described, by way of example, with reference to the accompanying drawings, in which.

Figure 4A:
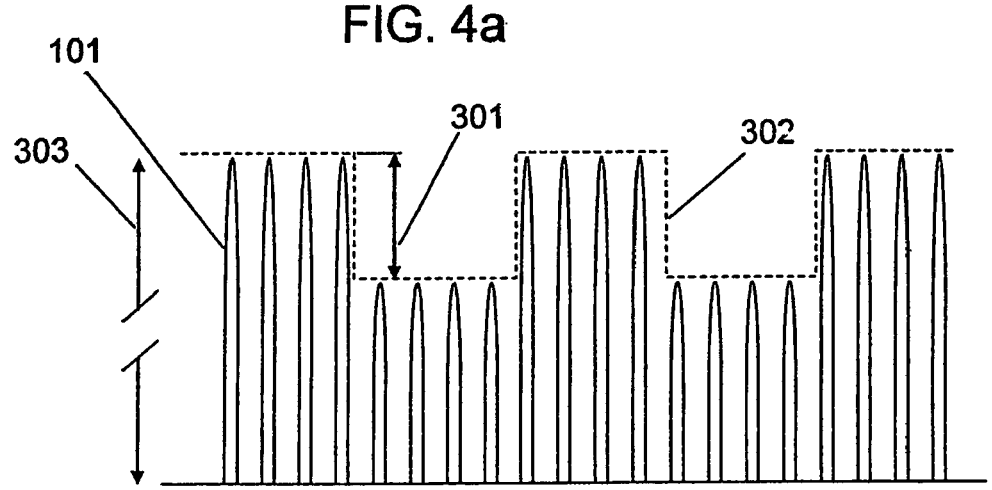
Figure 4B:
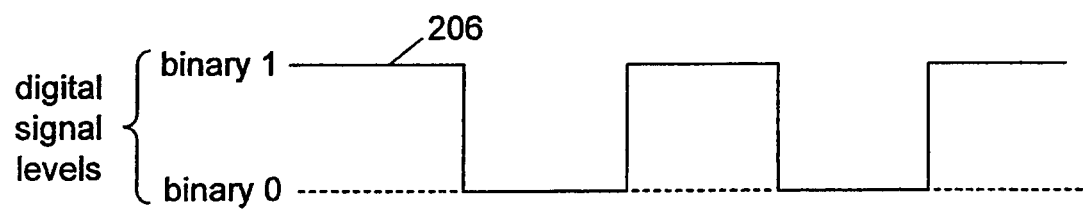
Figure 4C:
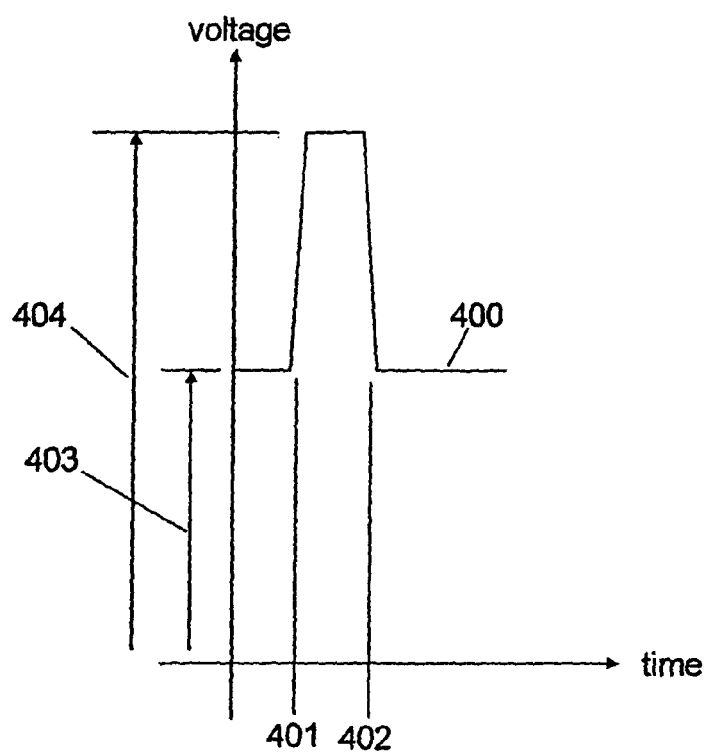
Figure 5:
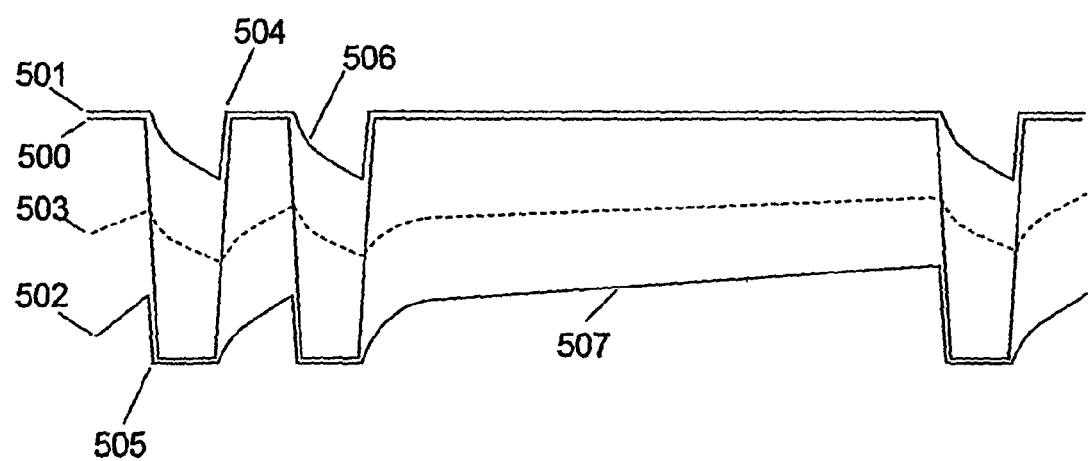
Figure 6:
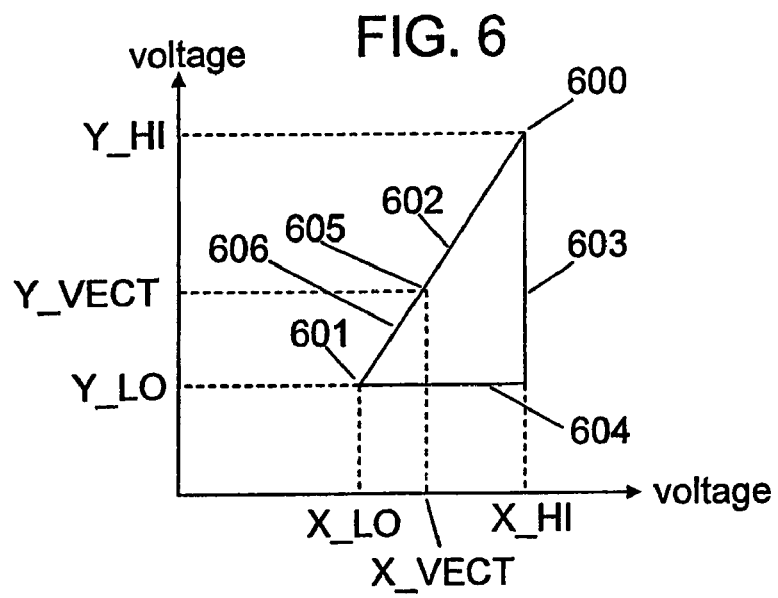
Figure 7:
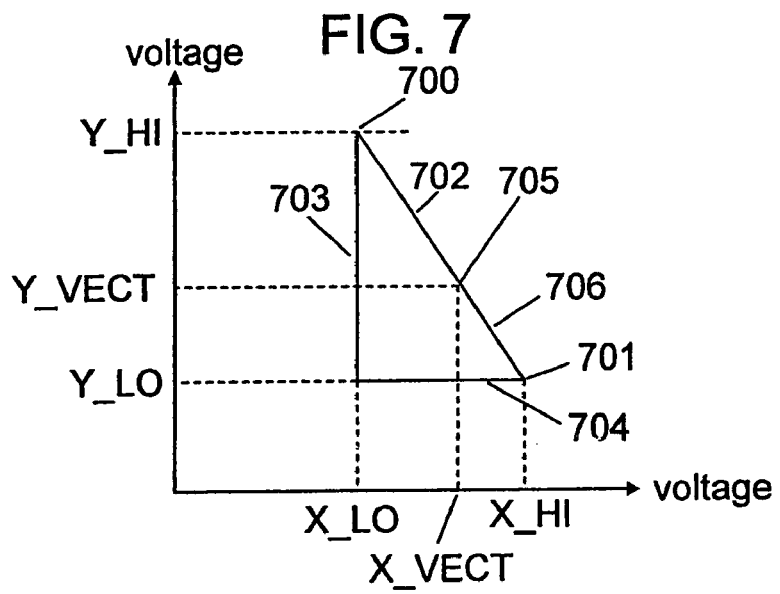
Figure 8:
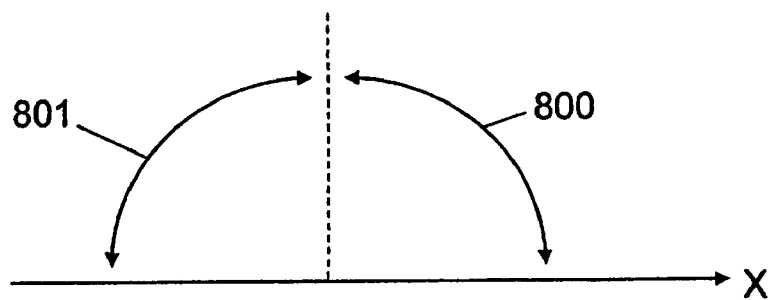
Figure 9:
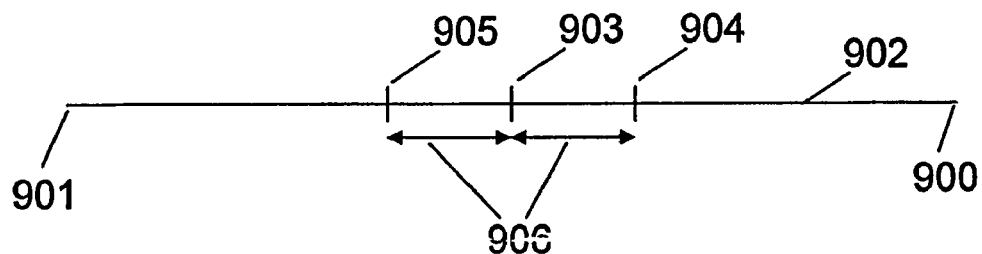
Figure 11:
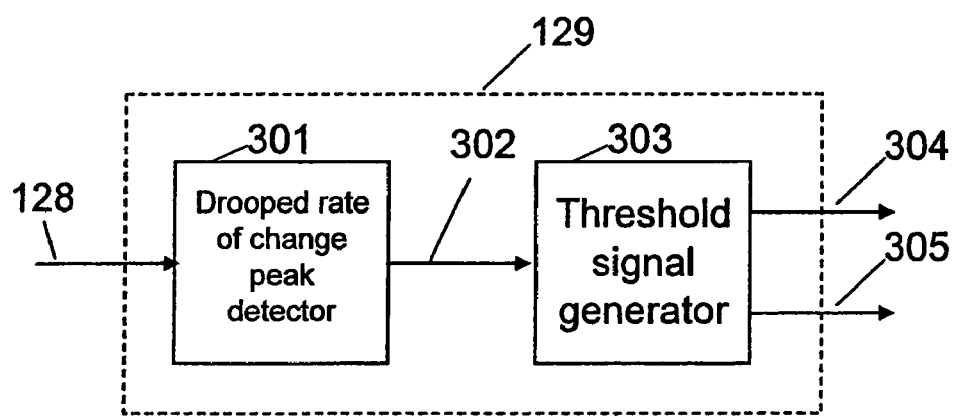
Figure 10:
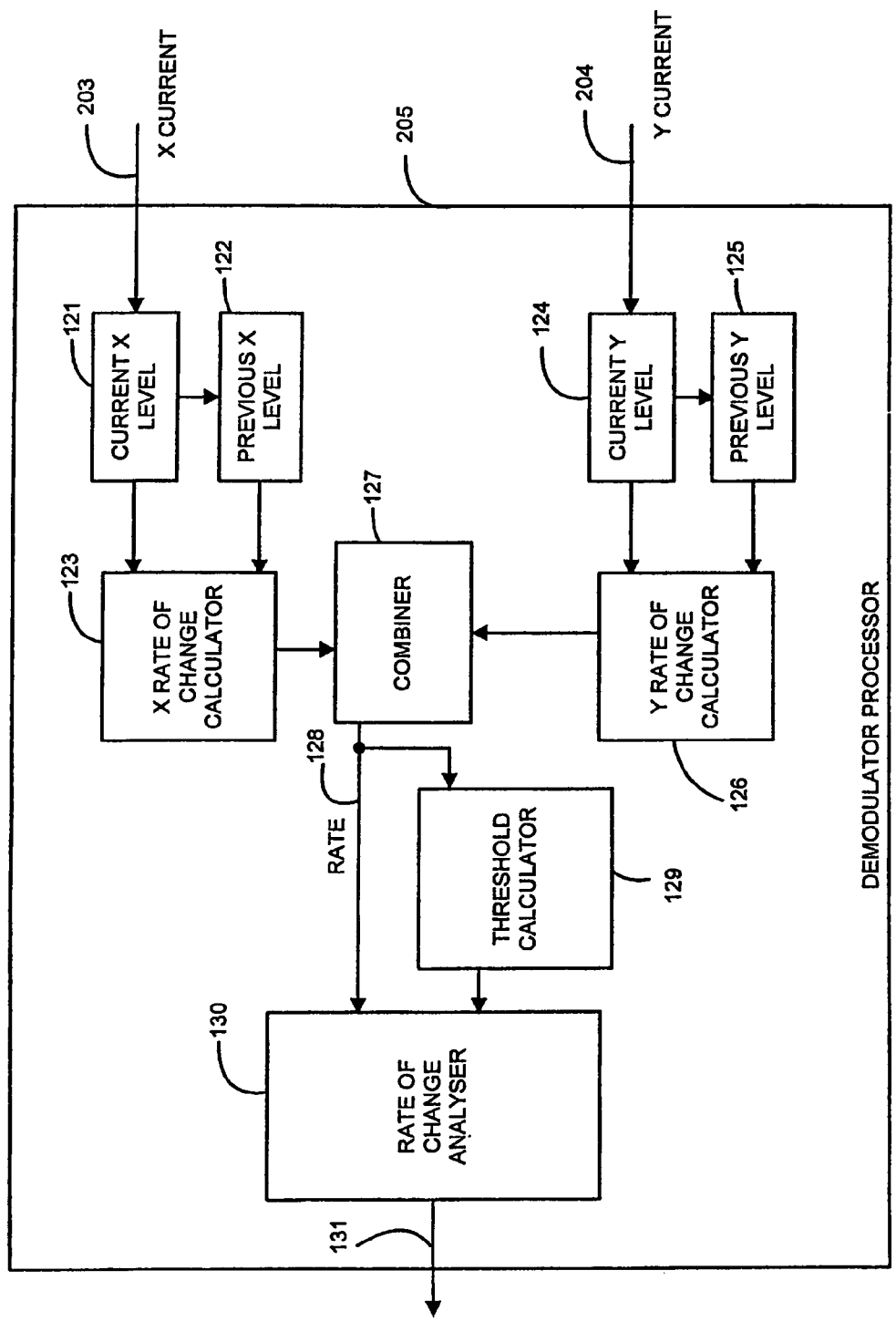

FIGS. 4a and 4b show examples of a typical modulated RF signal and the corresponding digital signal while FIG. 4c shows an example of a modulation signal showing a pulse representing a transition from a logic state 0 to a logic state 1;

FIG. 5 shows signals for explaining operation of a peak detector of a demodulator of a near field RF communicator embodying the invention;

FIGS. 6 and 7 show signal vectors with positive and negative angles, respectively;

FIG. 8 shows how positive and negative angles are defined;

FIG. 9 shows slice and squelch hysteresis levels;

FIG. 10 shows a functional block diagram illustrating the functionality of another example of a demodulator processor of demodulation processing circuitry of a near field RF communicator embodying the invention; and FIG. 11 shows a functional block diagram illustrating in greater detail one example of a threshold calculator of the demodulator processor illustrated in FIG. 10.

With reference to the drawings in general, it should be understood that any functional block diagrams are intended simply to show the functionality that exists within a device and should not be taken to imply that each block shown in the functional block diagram is necessarily a discrete or separate entity. The functionality provided by a block may be discrete or may be dispersed throughout the device or throughout a part of the device. In addition, the functionality may incorporate, where appropriate, hard-wired elements, software elements or firmware elements or any combination of these. The functionality may be provided wholly or partially as an integrated circuit or collections of integrated circuits.

Figure 1:
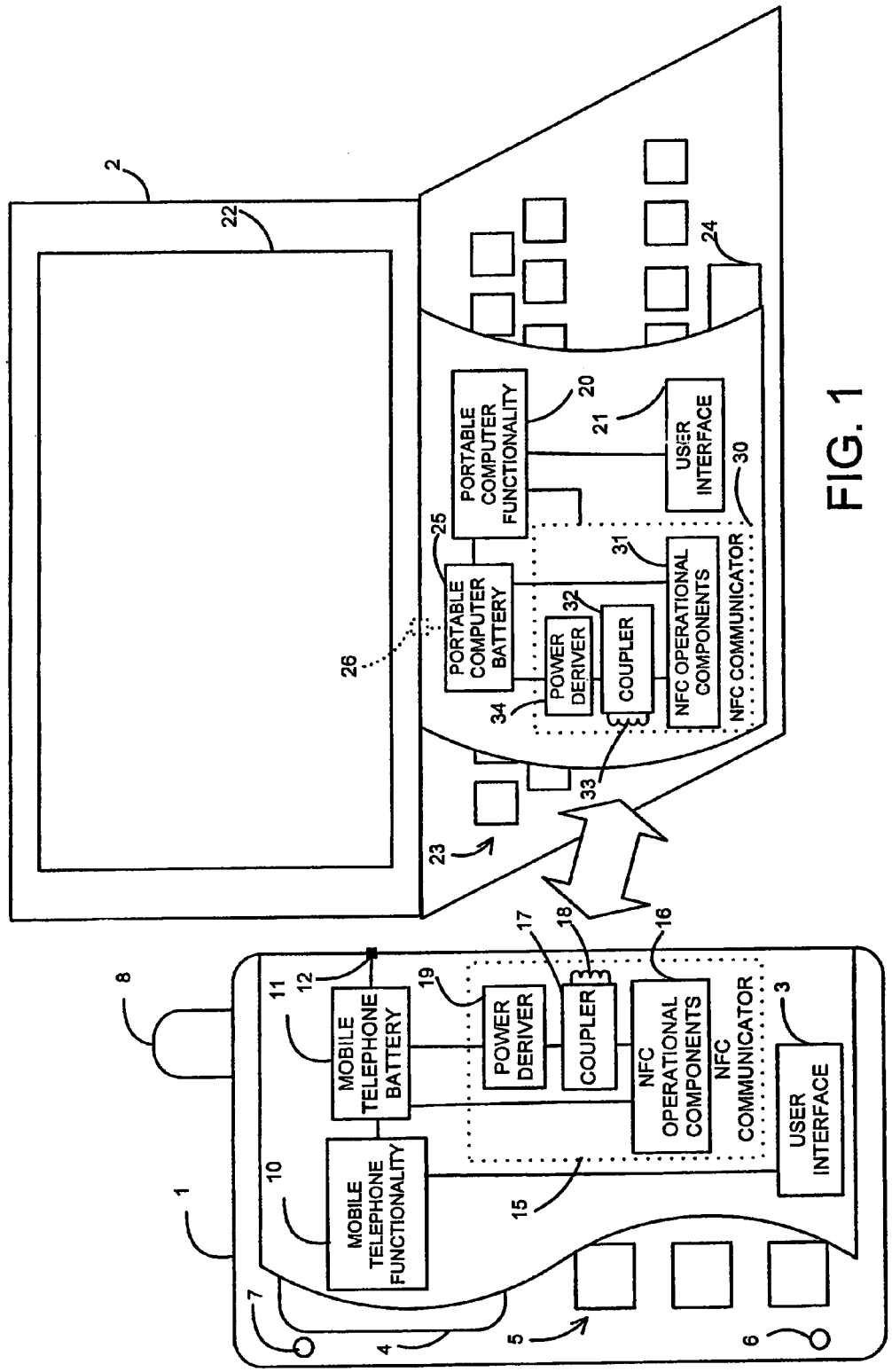
FIG. 1 shows a representational diagram illustrating communication between two near field RF communications enabled devices.

Referring now specifically to FIG. 1, there is shown a representational diagram illustrating communication between two near field RF communications enabled devices. In FIG. 1 the representations of the near field RF communications enabled devices have been show partly cut-away and the functionality provided by the near field RF communications enabled devices illustrated by way of a functional block diagram within the near field RF communications enabled device.

As shown in FIG. 1, one near field RF communications enabled device comprises a cellular telephone device 1 and the other near field RF communications enabled device comprises a portable computer 2 such as a notebook or laptop computer.

The cellular telephone device 1 has the usual features of a cellular telephone including mobile telephone functionality 10 (in the form of, usually, a programmed controller, generally a processor or microprocessor with associated memory or data storage, for controlling operation of the cellular telephone in combination with a SIM card), an antenna 8 for enabling connection to a mobile telecommunications network, and a user interface 3 with a display 4, a keypad 5, a microphone 6 for receiving user voice input and a loudspeaker 7 for outputting received audio to the user. The cellular telephone device also has a mobile telephone battery 11 coupled to a charging socket 12 via which a mains adapter (not shown) may be connected to enable charging of the mobile telephone battery 11. The cellular telephone device 1 may have an alternative or additional power supply (not shown), for example a reserve battery or emergency battery. The cellular telephone device may be a standalone cellular telephone (mobile telephone or cellphone) or may comprise a device such as a computer, for example a notebook, laptop or PDA, having cellular telephone functionality.

Similarly, the portable computer 2 has the usual features of a portable computer including portable computer functionality 20 in the form of, usually, a processor with associated memory in the form of ROM, RAM and/or hard disk drive, one or more removable media drives such as a floppy disk drive and/or a CDROM or DVD drive, and possibly a communications device for enabling the portable computer to connect to a network such as the Internet. The portable computer 2 also includes a user interface 21 including a display 22, a keyboard 23 and a pointing device, as shown a touchpad 24. The portable computer 2 also has a portable computer battery 25 coupled to a charging socket 26 via which a mains adapter (not shown) may be connected to enable charging of the portable computer battery 25.

In addition, as shown in FIG. 1, both near field RF communications enabled devices 1 and 2 have a near field RF communicator in the form of an NFC communicator 15 and 30. As shown, the near field RF communicators 15 and 30 are incorporated within the larger devices or hosts and, as with the other functional blocks, may be discrete entities within the hosts or may be provided by features dispersed throughout or integrated within the hosts or a part of the hosts.

Each NFC communicator 15 and 30 comprises NFC operational components 16 and 31 for, as will be described below, enabling control of the NFC functionality and generation, modulation and demodulation of an RF signal. Each NFC communicator 15 and 30 also comprises an inductive coupler 17 and 32 comprising an inductor or coil in the form of an antenna 18 and 33. The inductive couplers 17 and 32 enable an alternating magnetic field (H field) generated by the antenna 18 (or 33) of one NFC communicator 15 (or 30) by transmission of an RF signal (for example a 13.56 Mega Hertz signal) to be inductively coupled to the antenna 33 (or 18) of the other NFC communicator 30 (or 15) when that antenna is within the near field of the RF signal generated by the one NFC communicator 15 (or 30). The possible range of such inductive coupling will depend on the design of the NFC communicator; typically the range is several centimeters but may be up to 1 meter.

The NFC communicators 15 and 30 are coupled to the cellular telephone device and portable computer functionality 10 and 20, respectively, to enable data and/or control commands to be sent between the NFC communicator and the host device and to enable user input to the NFC communicator. Communication between the user interface 3 or 21 and the NFC communicator 15 or 30 is via the host device functionality 10 or 20, respectively.

Each of the NFC communicators 15 and 30 has a power deriver 19 and 34. The power derivers 19 and 34 may be, for example, batteries such as button cells or other small batteries. Alternatively or additionally, as shown by the dashed lines in FIG. 1, the power derivers 19 and 34 may comprise couplings to the host batteries 11 and 25 and/or may be arranged to derive power from an RF signal inductively coupled to each of the NFC communicators 15 and 30.

It will be appreciated that FIG. 1 shows only examples of types of larger devices or hosts. Other examples of such larger devices or hosts are, for example, personal digital assistants, notebooks, other computing devices such as personal or desk top computers, computer peripherals such as printers, or other electrical devices such as portable audio and/or video players such as MP3 players, IPODs®, CD players, DVD players. Further examples of such larger devices or hosts are other electrical or electronic products, for example consumer products such as domestic appliance or personal care products, and other electrical or electronic devices, apparatus or systems. Some areas of application are payment systems, ticketing systems, for example in tickets (for example parking tickets, bus tickets, train tickets or entrance permits or tickets) or in ticket checking systems, toys, games, posters, packaging, advertising material, product inventory checking systems and so on.

Also, rather than being incorporated within the host device, the NFC communicator 15 or 30 may be associated with the host device, for example by a wired or wireless coupling that is capable of power transfer. In such a case, a housing of the NFC communicator 15 or 30 may be physically separate from or may be attached to the housing of the host device; in the later case, the attachment may be permanent once made or the NFC communicator may be removable. For example, the NFC communicator 15 or 30 may be housed within: a housing attachable to another device; a housing portion, such as a fascia of the NFC communicator 15 or 30 or another device; an access card; or may have a housing shaped or configured to look like a smart card. For example an NFC communicator 15 or 30 may be coupled to a larger device by way of a communications link such as, for example, a USB link, or may be provided as a card (for example a PCMCIA card or a card that looks like a smart card) which can be received in an appropriate slot of the larger or host device.

As another possibility, one or both of the NFC communicators 15 or 30 may be a standalone NFC communicator, that is it may have no functionality beyond its near field RF communications functionality.

Figure 2:
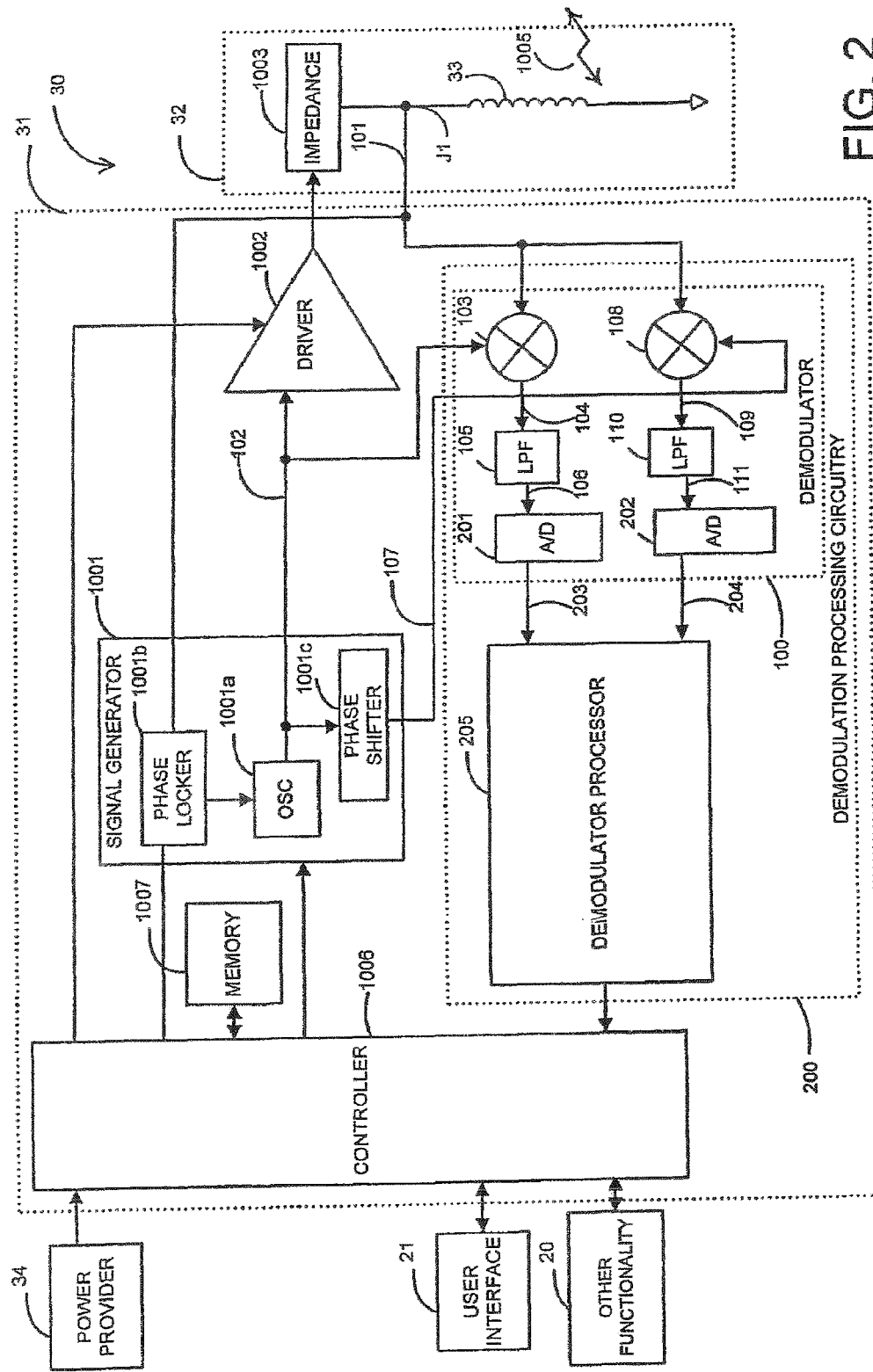
FIG. 2 shows a functional block diagram of a near field RF communicator embodying the invention.

FIG. 2 shows a functional block diagram of an NFC communicator in accordance with the invention. The NFC communicator could be either of the near field communicators shown in FIG. 1 or another NFC communicator. For the purposes of illustration, the reference signs corresponding to the near field communicator 30 of FIG. 1 are used in FIG. 2.

As mentioned above, the NFC communicator shown in FIG. 2 has NFC operational components 31, a power provider 34 and an inductive coupler or antenna circuit 32. Also, the NFC communicator may or may not also have or be capable of being connected or coupled with at least one of other functionality 20 (for example functionality of a host device such as described above) and/or a user interface 21.

The NFC operational components 31 comprise a controller 1006 for controlling overall operation of the NFC communicator. The controller 1006 is coupled to a data store or memory 1007 for storing data (information and/or control data) to be transmitted from and/or data received by the NFC communicator. The controller 1006 may be a microprocessor, for example a RISC processor or other microprocessor or a state machine. Program instructions for programming the controller and/or control data for communication to another NFC communicator may be stored in an internal memory of the controller 1006 and/or the data store 1007.

The NFC operational components 31 also comprise demodulation processing circuitry 200 operable to demodulate a RF carrier signal modulated by a modulation envelope signal having modulation levels (two in the case of a two level or binary modulation) and inductively coupled to the inductive coupler 32 from another NFC communicator in near field range and for supplying the thus extracted data to the controller 1006 for processing.

As shown in FIG. 2, the demodulation processing circuitry 200 comprises a demodulator 100 and a demodulation processor 205 separate from the controller 1006. However, as another possibility the controller 1006 may provide the functionality, or at least part of the functionality, of the demodulation processor 205. The demodulation processor 205 is preferably a DSP (digital signal processor) but other digital processors could be used such as, for example, a microprocessor, a microcontroller, a reduced instruction-set computer, or a state-machine.

In addition the NFC operational components 31 include an RF signal generator 1001 for generating an oscillating signal to be supplied to the inductive coupler 32 via a driver 1002 to enable an RF signal to be transmitted by the NFC communicator.

As shown in FIG. 2, the controller 1006 is operable to control the driver 1002 to enable modulation of the RF signal 1005 with data to be communicated to another NFC communicator. As another possibility, a separate modulator controllable by the controller 1006 may be provided between the signal generator 1001 and the driver 1002 to modulate the RF signal 1005 with data supplied by the controller 1006. In this example, modulation is achieved by modulating the impedance of the receiving circuitry, this being known as load modulation. As another possibility, an interference modulation technique may be used in which RP signals from the communicating NFC communicators constructively or destructively interfere.

The incoming modulation will be inductively coupled to the inductive coupler 32 in such a manner as to cause either one or both of amplitude and phase variations in the signal 101.

In the example shown in FIG. 2, the inductive coupler 32 comprises a series tuned antenna circuit comprising an impedance 1003 coupled to ground (earth) via an antenna coil 33 in series with the impedance 1003. The impedance 1003 is required such that modulation of the signal 101 received at junction or node 101 may have adequate strength. The impedance 1003 and may be incorporated within the driver 1002 if advantageous. As another possibility a parallel circuit configuration may be used or a combination of series and parallel circuit configurations. The exact design of the inductor and inductive coupler will depend on the functionality, range and emission standard compliance requirements, plus the environment within which the NFC communicator is designed to operate.

The demodulation processing circuitry 200 of the NFC communicator shown in FIG. 2 will now be described in greater detail. The demodulator 100 comprises an IQ demodulator, that is a demodulator that is operable to provide in-phase and quadrature (90 degrees out of phase) output demodulation signals. Thus the demodulator 100 comprises first and second analogue mixers or multipliers 103 and 108 each having a first input coupled to the junction J1 of the inductive coupler 32 to receive an RF signal 101 inductively coupled between the NFC communicator 30 and another NFC communicator and a second input to receive another RF signal to be mixed or multiplied with the RF signal 101. The other RF signal coupled to the in-phase multiplier 103 is an in-phase or I signal provided by the RF signal output 102 of an oscillator 1001*a* of the signal generator 1001 while the other RF signal coupled to the quadrature-phase multiplier 108 is a quadrature phase or Q signal provided by a phase shifter 1001*c* which shifts the RF signal output 102 phase shifted by 90 degrees.

As shown in FIG. 2, the signal generator 1001 comprises a phase locker 1000*b* such as a phase locked loop controllable by the controller 1006 to lock the phase of the oscillator 1001*a* output to that of a received RF signal when the near field communicator is in a receptive mode, that is expecting to receive a communication by inductive coupling of an RF signal from another NFC communicator. If the signal phase shift is not significant then it may be possible to achieve a required degree of accuracy without locking the phase of the signal generator 1000 output to the phase of the received carrier signal.

The outputs 104 and 109 of the mixers 103 and 108 are supplied to analogue low pass filters 105 and 110 which provide outputs 106 and 111 to analogue-to-digital converters 201 and 202, respectively, to provide digital inputs 203 and 204 to the demodulator processor 205.

The multiplication by each of the multipliers or mixers 103 and 108 of the corresponding two RF signals results in a signal that consists of the sum and the difference of the two input signals. In this example, where the two input signals to a mixer 103 or 108 are of the same frequency, the resultant output signals 104 and 109 each consist of a sum signal of twice the input frequency and a difference signal with zero frequency, that is a base-band signal with no carrier frequency. Both the sum and difference signals carry any modulation information present in the received RF signal 101. The low pass filters 105 and 110 are operable to remove signal content at twice the frequency of signal 102 to produce a baseband I or in-phase modulation signal at the output 106 of the low pass filter 105 and a baseband Q or quadrature-phase modulation signal at the output 111 of the low pass filter 110.

The I and Q signals 106 and 111 will each carry a certain level of modulation information but the amplitude of such information will vary depending upon the phase relationship between the RF signal 101 and the local oscillator signal 102 and the nature of the modulation of the RF signal 101. Using both the I and Q signals 106 and 111 enables the modulation to be recovered regardless of phase relationship changes between the output signal 102 of the signal generator 1001 and the inductively coupled RF signal 101 and also enables modulation to be recovered where the modulation amplitude is very low but there is sufficient phase modulation.

A first example of a method of using the in-phase I and quadrature phase Q signals to recover the modulation from an inductively coupled RF signal 101 will now be described.

Figure 3:
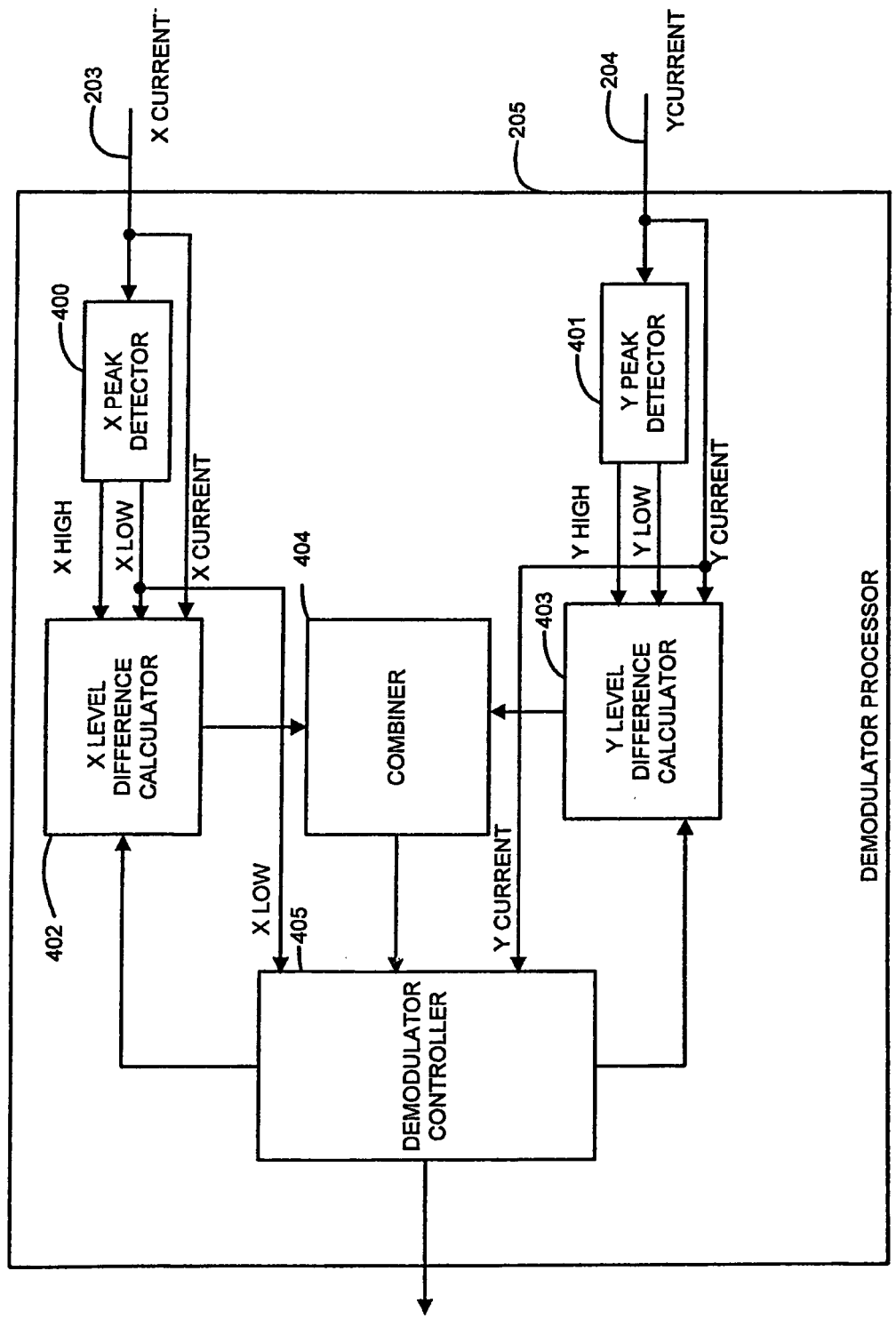
FIG. 3 shows a functional block diagram illustrating the functionality of one example of a demodulator processor of demodulation processing circuitry of a near field RF communicator embodying the invention.

FIG. 3 shows the functionality provided by the demodulator processor 205 in this first example. For consistency with the graphical representations to be discussed below with respect to FIGS. 6 to 8, in the following the in-phase modulation signal will be referred to with a prefix of X, and the quadrature modulation signal will be referred to with a prefix of Y.

As shown in FIG. 3, the demodulator processor 205 comprises an X or in-phase peak detector 400 coupled to receive the digitized I modulation signal 203 and a Y or quadrature phase peak detector 401 coupled to receive the digitized Q modulation signal 204 from the analogue to digital converters 201 and 202, respectively. The X peak detector 400 is operable to supply low and high (X LOW and X HIGH) peak outputs to an X level difference calculator 402 while the Y peak detector is operable to supply low and high (Y LOW and Y HIGH) peak outputs to a Y level difference calculator 403. The X and Y level difference calculators 402 and 403 also receive, respectively, the current digitized X value (X CURRENT) and the current digitized Y value (Y CURRENT) from the analogue to digital converters 201 and 202, respectively. The X and Y level difference calculators 402 and 403 are operable, under the control of a demodulator controller 405, to supply difference signals to a combiner 404 which provides combined output signals to the demodulator controller 405 to enable the demodulator controller 405 to decide whether a transition between logical states has occurred.

The operation of the demodulator processor 205 will now be described with the aid of FIGS. 3 to 9. It will of course be appreciated that the operations described are carried out continuously during operation of the demodulation processor, that is for each clock cycle or sample period of the demodulation processor. In FIGS. 6 to 8, the X signals (that is the digitized in-phase modulation signals) are shown at 90 degrees to the Y signals (that is the digitized quadrature-phase modulation signals) to represent the orthogonality of, that is the 90-degree phase relationship between, the I and Q signals.

FIG. 4a shows a graphical representation in analogue form of an example of a carrier RF signal 101 modulated with a two modulation level or digital signal 206 represented graphically in FIG. 4b. The signal shown in FIG. 4a has an RF signal amplitude 303 and a modulation depth (that is the signal level difference between modulation representing a logical state one and modulation representing a logical state zero) 301. The dashed line 302 in FIG. 4a represents the modulation envelope. The modulation depth 301 may be very small in amplitude when compared to the RF signal amplitude 303.

FIG. 4c shows a graph of voltage against time illustrating part of a digital signal 203 or 204 output by the A/D converter 201 or 202 and shows a pulse defined by a transition at time 401 from a logic state 0 to a logic state 1 and a transition at time 402 from logic state 1 to logic state 0. The logic state 0 level is shown as being at a voltage 403 while the logic state 1 level is shown as being at a voltage 404. It will of course be appreciated that the signals 203 and 204 will consist of trains of pulses defined by such logic state 0 to logic state 1 (0/1) and logic state 1 to logic state 0 (1/0) transitions. In addition, the voltage levels 403 and 404 will vary depending upon the phase relationship between the received inductively coupled RF signal and the RF signal generated by the signal generator 1001. Thus, the voltage levels 403 and 404 will of course vary depending upon the manner of modulation by the originating NFC communicator and any affect of the environment in which communication is occurring. In some circumstances the voltage 404 may be only a very small amount greater than voltage 403 for example.

The manner of operation of the peak detectors 400 and 401 will now be described with reference to the graph of voltage against time shown in FIG. 5.

The signal received by the peak detector 400 or 401 is represented by the line 500 in FIG. 5. The peak detectors 400 and 401 each comprise a drooped positive peak signal provider and a drooped negative peak signal provider.

Each drooped positive peak signal provider provides a signal 501 which rises immediately to a maximum level (the positive peak value) when the voltage level of the received signal increases beyond the current drooped peak level (as shown at time 504 in FIG. 5) and which drops (region 506 shows the signal dropping) in a logarithmic manner towards a mean value when the voltage level of the received signal starts to drop. The mean value is equal to one half of the positive peak minus the negative peak and is represented by the dashed line 503 in FIG. 5.

Each drooped negative peak signal provider provides a signal 502 which drops immediately to a minimum level (the negative peak value) when the voltage level of the received signal decreases beyond the current drooped peak level (as shown at time 505 in FIG. 5) and which rises in a logarithmic manner (region 507 shows the signal rising) towards the mean value 503 when the voltage level of the received signal starts to rise. A fast logarithmic rise/fall will tend to increase sensitivity whereas a slow rise/fall will tend to suppress the effects of noise. The actual logarithmic rate selected will be dependent upon the reactive importance of sensitivity and noise. The rise/fall need not necessarily be logarithmic, any appropriate gradual rise/fall curve may be used.

The drooped peak detectors 400 and 401 thus each produce two output signals, a negative peak signal (X LOW and Y LOW respectively) and a positive peak signal (X HIGH and Y HIGH respectively).

The combiner 404 is operable to determine the magnitude of a logic level transition vector representing the difference between the negative peak signals (X LOW and Y LOW) and positive peak signals (X HIGH and Y HIGH). This vector is the best measure to detect logic transitions in the modulated signal because it takes into account all available phase and amplitude information within the two X and Y signals. It is the length of the logic level transition vector that is important so it can be treated as a simple scalar quantity or magnitude. However, although the actual angle of the logic level transition vector does not matter, the demodulator controller 405 needs to determine whether the vector angle is positive or negative. The reason for this is illustrated by the graphical representations in FIGS. 6 and 7 of X against Y showing logic level transition vectors 606 and 706. In FIG. 6, the logic state 1 of the modulated RF signal 101 (FIG. 1) is such that the Y is at Y HIGH when X signal is at X HIGH. However whether or not this is the case will depend upon the phase relationship between the incoming modulated RF signal 101 (FIG. 1) and the locally generated RF signal 102 (FIG. 1). If this phase relationship changes, logic state 1 may occur when Y is at Y HIGH and X is at X LOW as shown in FIG. 7. FIG. 6 shows that the logic level transition vector 606 has a positive vector angle (that is the vector angle 800 is between 0 and 90 degrees with respect to the X-axis in FIG. 8) while FIG. 7 shows that the logic level transition vector 706 has a negative vector angle (that is the vector angle 801 is between 90 and 180 degrees with respect to the X-axis in FIG. 8).

In the example shown in FIG. 3, the demodulator controller 405 receives the Y CURRENT and X LOW signals and determines whether the logic level transition vector 606 or 706 is at a positive or negative angle by checking the Y value Y CURRENT when the X signal is at X LOW. If the Y value is below the halfway point along the logic level transition vector 605 or 705 when the X signal is at X LOW then demodulator controller 405 determines the angle to be positive as shown in FIG. 6. To avoid rapid fluctuations in this decision-making when the Y value Y CURRENT is near to the value of the halfway point, some hysteresis is built in. It will of course be appreciated that the demodulator controller 405 may use others of the X and Y values to determine whether the vector angle is positive or negative.

The length or magnitude (602 in FIG. 6 and 702 in FIG. 7) of the logic level transition vector 606 or 706 between the positive peak X and Y signals (X HIGH and Y HIGH, represented by position 600 in FIG. 6 and position 700 in FIG. 7) and the negative peak X and Y signals (X LOW and Y LOW, represented by position 601 in FIG. 6 and position 701 in FIG. 7) represents the transition between the two logic states 0 and 1. This logic level transition vector 606 or 706 corresponds to the hypotenuse of a right-angled triangle where a first side (603 in FIG. 6 and 703 in FIG. 7) of the right-angled triangle is represented by the difference between the positive and negative peak Y signals, Y HIGH-Y LOW, and the other side (604 in FIG. 6 and 704 in FIG. 7) of the right-angled triangle is represented by the difference between the positive and negative peak X signals, X HIGH-X LOW.

The combiner 404 is operable to determine the magnitude of the logic level transition vector representing the difference between the negative peak signals (X LOW and Y LOW) and positive peak signals (X HIGH and Y HIGH) and to supply the resulting logic level transition vector magnitude signals to the demodulator controller 405.

Whether the vector angle is determined to be positive as in FIG. 6 or negative as in FIG. 7, the demodulator controller 405 approximates the length of the vector by adding the lengths of the other two sides of the right angled triangle for which the vector represents the hypotenuse so that:

Hypotenuse 602 or 702=(X HIGH−X LOW)+(Y HIGH−Y LOW).

In each sample period of the demodulation processor 205, the demodulation controller 405 determines whether the modulation represents a transition between the logical states one and zero. For the reasons set out above, the modulation depth and level may vary and modulation levels intermediate to the positive and negative peak values may be received. When the modulation level at a sampling period is such an intermediate level, the demodulator processor 205 has to determine whether a transition between logical states has indeed occurred.

In this example, the demodulator processor 205 determines whether a logic level transition has occurred by determining whether the length of an intermediate value vector defined by the difference between the current X and Y values X CURRENT and Y CURRENT (which may, for example, correspond to position 605 in FIG. 6 or 705 in FIG. 7) and the current minimum X and Y values X LOW and Y LOW (that is the last X LOW and Y LOW signals provided by the X and Y peak detectors 400 and 401) is less than or more than half the length of the logic level transition vector 606 or 706. Thus the demodulator processor 205 determines that the halfway point along the logic level transition vector 606 or 706 represents the change between logic states with in this example the modulation level representing a logic state zero if that difference is below a point half-way along the vector 602 or 702 and the modulation level representing a logic state one if that difference is above a point half-way along the vector 602 or 702. By this said means the demodulator controller 405 determines where logic state transitions occur in the modulated RF input signal and then uses the determined logic state transitions to reconstruct the received transmitted modulation signal.

Where the vector angle is positive as in FIG. 6, the demodulator controller 405 causes the X and Y difference calculators 402 and 403 and the combiner 404 to calculate the position 605 of a current signal sample along the vector 602 as:

Current signal sample 606 position 605=(X CURRENT−X LOW)+(Y CURRENT−Y LOW), whereas where the vector angle is negative as in FIG. 7, the demodulator controller 405 causes the X and Y difference calculators 402 and 403 and the combiner 404 to calculate the position 705 of a current signal sample along the vector 702 as:

Current signal sample 706 position 705=(X HIGH−X CURRENT)+(Y CURRENT−Y LOW)

Because the same method is used to calculate both the length of the hypotenuse 602 or 702 and the position 605 or 705 of a current signal sample along the vector, the relative position of the current sample is known without loss of accuracy and so a relatively accurate determination can be made as to whether a transition has occurred and thus as to whether the current sample signal represents a logic state one or a logic state zero. This avoids using Pythagoras' theorem which would require complex processing to calculate squares and square roots. Thus the complexity and costs of the demodulator can be reduced compared to one which required implementation of Pythagoras' theorem.

As described earlier the point along the logic state transition vector (602 in FIG. 6 and 702 in FIG. 7) at which a decision that the logic state has changed is made is simply the halfway point. This decision point is usually referred to as a slice level. FIG. 9 illustrates this by showing a scalar 902 representing the vector (602 in FIG. 6 or 702 in FIG. 7) where the endpoint XY_MAX 900 of the scalar represents the points 600 and 700 in FIGS. 6 and 7, and where endpoint XY_MIN 901 represents the points 601 and 701 in FIG. 6 and FIG. 7.

The slice level 903 is thus=(XY_MAX−XY_MIN)/2.

Hysteresis should be added to the slice level decision to avoid rapid fluctuations between logic state one and logic state zero decisions where the input signal is close to the slice level. In this example, this is achieved by the demodulator processor adding a squelch value 906 (FIG. 9) to move the positive threshold to position 904 and subtracting the squelch value 906 to move the negative threshold to position 905 so that a state transition from logic state zero to logic state one is determined to have occurred only when the current signal level 605 (FIG. 6) or 705 (FIG. 7) rises above the positive threshold 904 and a state transition from logic state one to logic state zero is determined to have occurred only when the current signal level 605 (FIG. 6) or 705 (FIG. 7) falls below the negative threshold 905.

The actual squelch value is determined according to the ratio of the lengths of sides of the triangle 603:604 (FIG. 6) and 703:704 (FIG. 7) so as to avoid the loss of accuracy which may otherwise occur if the same squelch value were used regardless of the modulation depth. As an example, the demodulator processor may multiply the squelch value 906 by 0.9 if the ratio of the triangle sides 603:604 (FIG. 6) or 703:704 (FIG. 7) is greater than 4:1 and multiply the squelch value by 0.75 if the ratio of the triangle sides 603:604 (FIG. 6) and 703:704 (FIG. 7) is less than 4:1, thereby reducing any loss of accuracy due to use of the squelch factor to an acceptable 10%. The actual squelch value will depend upon the level of accuracy required and may be different from those given above. Other methods could however be used to reduce said loss of accuracy. For example, another way the demodulator processor may reduce loss of accuracy is to add a correction factor to the shortest side of the right angle triangle, for example by multiplying the length of the shortest side by a correction factor to reduce the side length. An example correction factor for an accuracy of ±6% that results in a simplified multiplication calculation is 0.34375 decimal which is equal to 0.01011 in binary and so the multiplication can be achieved by adding three shifted numbers. The actual correction factor will depend upon the required accuracy. In some circumstances it may be possible to scale the longer rather than the shorter of the two sides defining the hypotenuse.

FIGS. 10 and 11 illustrate the functionality of another example of a demodulator processor 205 of demodulation processing circuitry of a NFC communicator embodying the invention. In this example, the demodulator processor 205 comprises stores 121 and 122 to store the current X level and at least one previous X level and stores 124 and 125 to store the current Y level and at least one previous Y level, a X rate of change calculator 123 coupled to receive the current and previous X levels and a Y rate of change calculator 126 coupled to receive the current and previous Y levels, a combiner 127 operable to combine the rate of change data, a threshold calculator 129 operable to receive a rate of change signal from the combiner 127 and a rate of change analyzer 130 to determine logic state transitions from the rate of change data and the thresholds provided by the threshold calculator 129. Thus, in this example, rate of change information is used effectively to recover modulation from signals that vary slowly and in the presence of noise.

The stores 121, 122 and the stores 124 and 125 may be provided by respective shift registers. The rate of change calculators 123 and 126 determine values for the magnitude of dX/dt and dY/dt (that is the change from sample to sample), respectively, depending upon the available stored previous values. For example, the rate of change calculators 123 and 126 may simply determine the difference between the current and the last sample values. In that case, in operation of the demodulator processor shown in FIG. 10, as the X and Y signals are sampled, the current levels of the signals $X\_t_n$ and $Y\_t_n$ are stored in the current X and Y level stores 121 and 124. At each sample time interval, as each new sample is stored, the currently existing sample values are moved and stored in previous X and Y level stores 122 and 125.

As an example, where only the previous X and Y sample values or levels $X\_t_{n-1}$ and $Y\_t_{n-1}$ are stored in addition to the current sample values $X\_t_n$ and $Y\_t_n$, the X and Y rate of change calculators 123 and 126 determine, for each sample interval, a rate of change of signal by determining the magnitude of the difference of these two signals $|X\_t_n - X\_t_{n-1}|$ and $|Y\_t_n - Y\_t_{n-1}|$, respectively.

As other possibilities, the previous sample value used need not be the immediately preceding sample value but could be an earlier sample value. For example the rate of change at the nth sample value may be determined as:

$$Dn = n - (n-3); \text{ or}$$

$$Dn = n - (n-4); \text{ or}$$

$$Dn = n - (n-5),$$

where Dn is the rate of change and (n−3) is the sample value for three samples before n and so on.

As another possibility, a combination of previous sample values, for example a weighted combination such as:

$$Dn = n + 0.5(n-1) - 0.5(n-3) - (n-1)$$

may be used.

Using more sample points allows greater resolution for smaller modulation levels while using more widely spaced sample points may filter out apparently high rates of change due to noise.

These two rate of change signals are supplied to the combiner 127 which, as will be described in detail below, outputs a combined rate of change signal 128 labeled RATE in FIG. 10.

The threshold calculator 129 provides a threshold value for determining whether the combined rate of change signal RATE is sufficiently high to indicate a correct modulation edge (that is a transition or change from a logical one to a logical zero or vice versa). The threshold calculator 129 also provides a further threshold value for determining whether the combined rate of change signal RATE is sufficiently low to indicate that no modulation edge is present.

The rate of change analyzer 130 uses the combined rate of change signal RATE and the threshold signal or signals from the threshold calculator 129 to determine whether the combined rate of change signal RATE is sufficiently high for sufficient contiguous samples to indicate a correct modulation edge. Where the further threshold value is provided by the threshold calculator 129, then the rate of change analyzer 130 may also determine whether the combined rate of change signal RATE is sufficiently low for sufficient contiguous samples to indicate that a modulation edge has ceased. The rate of change analyzer 130 is described in more detail below.

The threshold calculator 129 and the rate of change analyzer 130 are thus used to correctly determine each modulation edge transition and to output a single edge change signal 131 corresponding to each edge change of the modulation signal.

The combiner 127 may:
i) add the magnitudes of the two rate of change signals to give a combined rate of change signal RATE; or
ii) consider the X and Y rate of change signals as representing a vector in two-dimensional graphical space between the current position represented as $(X\_t_n, Y\_t_n)$, and the previous position represented as $(X\_t_{n-x}, Y\_t_{n-x})$ and determine the combined rate of change to be the distance between the current position n and the previous position (n−x) by calculating the length of the hypotenuse of a right-angled triangle in accordance with Pythagoras' theorem as being equal to the square-root of $$(|X\_t_n - X\_t_n|^2 + |Y\_t_{n-x} - Y\_t_{n-x}|^2); \text{ or}$$

iii) approximate the calculation of the hypotenuse as described above with reference to FIGS. 3 to 9 by multiplying the shorter of the two adjacent sides by a scaling factor and then adding that scaled length to the length of the other adjacent side so that, if, for example, side $|X\_t_n - X\_t_{n-x}|$ is shorter than side $|Y\_t_n - Y\_t_{n-x}|$, then the hypotenuse will be equal to $|X\_t_n - X\_t_{n-x}|*\text{SCALE\_FACTOR} + |Y\_t_n - Y\_t_{n-x}|$ where the SCALE_FACTOR may be 0.34275 as described above which is equal to 0.01011 in binary, and so the multiplication can be achieved by adding three shifted numbers. The actual correction factor will depend upon the required accuracy. In some circumstances it may be possible to scale the longer rather than the shorter of the two sides defining the hypotenuse.

The third example iii) is preferred because it provides an acceptably accurate representation of changes in the modulation signal while using acceptably small amounts of signal processing, enabling a high quality low cost demodulator to be used. Persons skilled in the art will know that the above examples are not exhaustive and that other combinations or variations may provide signals of sufficient quality to enable correct demodulation.

Preferably the threshold calculator 129 recalculates the threshold signals at every sample time interval. The threshold calculator 129 is operable to determine threshold values that move proportionally with the detected peak rate of change so as to give good noise immunity and accurate measurement. In order to achieve this, as shown in FIG. 11, the threshold calculator 129 comprises a drooped rate of change peak detector 301 which supplies to threshold signal generator 303 a DROOPED_PEAK_RATE signal 302 representing the drooped peak rate of change for the positive peak signal.

The drooped peak rate of change is calculated at each clock cycle by logarithmically reducing the measured positive peak rate of change by a droop factor. For example, the drooped peak rate of change may be calculated as $$\text{PEAK\_ROC} = [\text{Peak} - (\text{Peak}*2^{-DROOP})]$$

A low value, for example 2, for DROOP results in a droop by a ¼ difference each cycle and a higher value such as 8 results in a very slow droop rate. Where the value of the rate of change RATE is higher than the current peak rate of change, then DROOP may be zero so that the peak rate of change follows the rate of change. Modifying the droop rate of change modifies the effect of past peaks. A fast DROOP rate tends to increase the sensitivity during signal reception while a slow droop rate tends to suppress the effect of noise during signal reception. The minimum peak rate of change should not be allowed to droop too far because this would cause the threshold values to fall to the noise floor. Accordingly, the drooped rate of change peak detector sets a minimum peak rate of change and any peak rate of changing falling below that minimum peak rate of change is set to that minimum peak rate of change. As persons skilled in the art will appreciate, hysteresis may be incorporated by the use of squelch values.

The threshold calculator uses the drooped peak rate of change PEAK_ROC to calculate two dynamic thresholds. The first threshold is the minimum sample-to-sample rate of change needed to signify a modulation edge and is given by the drooped peak rate of change multiplied by a first scaling factor where the scaling factor is either dynamically changed or predetermined. An increased rate of change is required for RATE to rise above MOD_RATE so that, in effect, the second derivative is monitored.

The threshold signal generator 303 also outputs a second, LOW_RATE threshold signal 305 equal to the DROOPED_PEAK_RATE multiplied by a second, smaller scaling factor, where the scaling factor is either dynamically changed or predetermined. This second threshold signal is used as the maximum sample to sample rate of change of signal level RATE that signifies that no change is occurring in the modulation signal 101.

In an example where the samples are 13.56 MHz samples and there is a three clock cycle delay in calculating PEAK_ROC, then the first threshold MOD_RATE may be determined such that the rate of change must be greater than ⅜ to 10/8 times the PEAK-ROC (with the values ⅝, 9/8 and 10/8 being valid and potentially useful where there is a three clock cycle delay in calculating PEAK_ROC) to satisfy the MOD_RATE criterion and the second threshold LOW_RATE may be determined such that the rate of change between successive data samples must be less than ⅛ to ⅝ of PEAK-ROC to satisfy the LOW_RATE criterion.

In the example described with reference to FIG. 11, the drooped rate of change signal 302 cannot be allowed to drop too low otherwise MOD_RATE 304 will become equal to LOW_RATE 305 and if this were to happen then small ripples on the input would cause erroneous changes in the demodulation signal 131 (FIG. 10). To stop the signals 302 from dropping too low, the threshold signal generator 303 compares these signals at each sample interval with a predetermined value, and if the said signal values or levels drop below this predetermined value, the signal values are made equal to the predetermined value.

The rate of change analyzer 130 uses the combined rate of change signal RATE to determine when to change the state of the output demodulation signal 131 but will only change the output demodulation signal 131 if RATE is higher than the threshold MOD_RATE 304 (FIG. 11) for a predetermined number of consecutive sample time periods.

In addition, the rate of change analyzer 130 is configured so as not to allow a subsequent change to the output before RATE falls below LOW_RATE (FIG. 11) for a predetermined number of consecutive sample periods. This ensures that there must be a period of low rate of change of modulation signal (i.e. a non-changing signal) before another modulation edge change can be recognized. The predetermined number of consecutive sample time periods may, for example, be set to a number between one and four (and may be set to different values for the MOD_RATE and LOW_RATE thresholds); this aids immunity to noise, but higher settings reduce sensitivity.

As described above with reference to FIGS. 10 and 11, the peak rate of change X and Y values are determined and these are then combined. As another possibility, the X and Y signals may first be combined to produce combined XY signals and then the rate of change determined by determining the difference between the combined current XY signals and the combined previous XY signal or signals.

As described above, the near field RF communicators are NFC communicators capable of both initiating and responding to initiation of a near field RF communication. As another possibility, one of the communicating near field RF communicators may be an "initiating near field RF communicator" such as an RFID transceiver or reader are capable of initiating but not of responding to initiation of near field RF communication and the other an NFC communicator in target mode or a "responding near field RF communicator" such as an RFID transponder or tag capable of responding to initiation of but not of initiating a near field RF communication with another near field RF communicator, provided that the responding near field RF communicator has its own RF signal generator. As another possibility, one of the communicating near field RF communicators may be a "responding near field RF communicator" and the other an NFC communicator in initiator mode. Examples of near field RF communicators are defined in various standards for example ISO/IEC 18092, ISO/IEC 14443, ISO/IEC 15693 ISO/IEC 21481. An NFC communicator may operate fully or partially in accordance with ISO/IEC 18092 and/or ISO/IEC 21481 while an RFID reader or RFID tag may operate fully or partially in accordance with RFID ISO/IEC 14443A or ISO/IEC 15693.

Where the near field RF communicator is an NFC communicator then it may operate in an initiator mode (that is like an initiating near field RF communicator) or in a target mode, (that is like a responding near field RF communicator), dependent on the mode to which the NFC communicator is set. The mode may be determined by the controller 2 or may be determined in dependence on the nature of a received near field RF signal. An NFC communicator may communicate in accordance with an active or passive protocol. When NFC communicators communicate using an active protocol, an initiating NFC communicator will transmit an RF field and following completion of its data communication turn off its RF field and the responding NFC communicator will then transmit its own RF field and data before again turning off the RF field and so on. When NFC communicators communicate using a passive protocol the initiating NFC communicator will transmit and maintain its RF field throughout the entire communication. The protocol used will depend on instructions received from the controller 2 and the response received from a responding NFC communicator.

The data communicated between near field RF communicators by modulation of an RF signal will depend upon the communications protocol under which the near field RF communicators are operating and the data to be communicated. Further details of possible communications protocols may be found in the above mentioned various standards for example ISO/IEC 18092, ISO/IEC 14443, ISO/IEC 15693 ISO/IEC 21481.

A near field RF communicator may or may not be self-powered, for example where the near field RF communicator 1 is a responding near field RF communicator then it may be a passive (that is not self-powered) tag or transponder which is powered only when an RF signal generated by another near field RF communicator is inductively coupled to the tag or transponder, in which case the power provider will be replaced by a rectifier coupled to the inductive coupler.

As described above, a near field RF communicator has an IQ demodulator (100) and a demodulator processor (205) that identifies a transition between logical states on the basis of either: 1) a magnitude obtained by adding a first value representing a difference between positive and negative peaks in the in-phase modulation and a second value representing a difference between positive and negative peaks in the quadrature phase modulation; or 2) whether a combined value representing a rate of change in the in-phase modulation and in the quadrature phase modulation exceeds a threshold.

It should of course be understood that the polarities given above may be reversed so that, for example, a low signal represents a logic state one and a high signal a logic state zero.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A near field radio frequency (RF) communicator, comprising:
    a coupler configured to receive a modulated RF signal by inductive coupling;
    a demodulator configured to receive the modulated RF signal, the demodulator comprising:
        a first multiplier configured to multiply the modulated RF signal by a first RF signal to produce an in-phase modulated signal, and
        a second multiplier configured to multiply the modulated RF signal by a second RF signal, in phase quadrature with the first RF signal, to produce a quadrature-phase modulated signal; and
    a demodulation processor comprising:
        a first and a second peak detector configured to detect negative and positive peaks in the in-phase modulated signal and the quadrature-phase modulated signal, respectively,
        a first difference calculator configured to determine a first difference between negative and positive peaks detected by the first peak detector,
        a second difference calculator configured to determine a second difference between negative and positive peaks detected by the second peak detector,
        a combiner configured to determine a length of a vector representing a difference between the negative and positive peaks by adding the first and second differences, and
        a controller configured to determine whether a logic state transition has occurred based upon the length of the vector to enable data to be extracted from the modulated RF signal.

2. The near field RF communicator of claim 1, wherein the combiner is further configured to scale at least one of the first and second differences before adding them.

3. The near field RF communicator of claim 2, wherein the combiner is further configured to scale a smallest of the first and second differences before adding them.

4. The near field RF communicator of claim 3, wherein the combiner is further configured to scale the smallest of the first and second differences by multiplying by 0.34275.

5. The near field RF communicator of claim 1, wherein the first difference calculator is further configured to determine a first current sample difference between the in-phase modulated signal for a current sample of the modulated RF signal and one of the negative and positive peaks detected by the first detector,
    wherein the second difference calculator is further configured to determine a second current sample difference between the quadrature-phase modulated signal for the current sample of the modulated RF signal and one of the negative and positive peaks detected by the second detector,
    wherein the combiner is further configured to add the first and the second current sample differences to produce a combined difference value, and
    wherein the controller is further configured to determine whether the logic state transition has occurred based upon whether the combined difference value is less than half the length of the vector.

6. The near field RF communicator of claim 5, wherein the controller is further configured to determine whether the vector has a positive or negative angle, and
    wherein the first and the second difference calculators are each further configured to determine a difference between their respective current sample differences and a same one of the negative and positive peaks when the vector has the positive angle and to determine a difference between their respective current sample differences and a different one of the negative and positive peaks when the vector has the negative angle.

7. The near field RF communicator of claim 1, further comprising:
a signal generator operable to supply the first and the second RF signals; and
a phase locker configured to lock a phase of the first and the second RF signals a phase of the modulated RF signal.

8. The near field RF communicator of claim 1, wherein the first and the second peak detector are configured and arranged to implement a drooped peak detector.

9. The near field RF communicator of claim 1, wherein the first and second peak detectors comprise:
a negative peak detector configured to provide a negative peak detection signal which drops to a minimum when a signal level of the modulated RF signal drops below a current peak level and rises gradually when the signal level of the modulated RF signal rises; and
a positive peak detector configured to provide a positive peak detection signal which rises to a maximum when the signal level of the modulated RF signal rises beyond a current peak level and drops gradually when the signal level of the modulated RF signal drops.

10. The near field RF communicator of claim 1, further comprising:
a first low pass filter and a second low pass filter, coupled to the first and the second multiplier, respectively, configured to derive in-phase modulation and quadrature-phase modulation from the in-phase and quadrature-phase modulated signals, respectively,
wherein the first and the second peak detectors are further configured to detect negative and positive peaks in the in-phase modulation and the quadrature-phase modulation, respectively.

11. The near field RF communicator of claim 1, further comprising:
a data store configured to store data; and
a modulator configured to modulate a RF signal in accordance with the data to enable communication of the data.

12. The near field RF communicator of claim 1, wherein the near field RF communicator is a near field communication (NFC) communicator and further comprises:
a data store configured to store data;
a modulator configured to modulate a RF signal in accordance with the data; and
a controller configured to initiate near field radio frequency communication with another near field RF communicator and to respond to near field radio frequency communication initiated by another near field RF communicator.

13. The near field RF communicator of claim 1, further comprising:
a power deliver configured to derive power from the modulated RF signal.

14. The near field RF communicator of claim 1, wherein the demodulator is implemented as part of a digital signal processor.

15. The near field RF communicator of claim 1, wherein the near field RF communicator is implemented as part of a cellular telephone device.

16. The near field RF communicator of claim 1, wherein the near field RF communicator is implemented as part of a device having cellular telephone functionality.

17. A near field radio frequency (RF) communicator, comprising:
a coupler configured to receive a modulated RF signal by inductive coupling;
a demodulator configured to receive the modulated RF signal inductively coupled to the coupler, the demodulator comprising:
a first multiplier configured to multiply the modulated RF signal by a first radio frequency signal to produce an in-phase modulated signal, and
a second multiplier configured to multiply the modulated RF signal by a second radio frequency signal, in phase quadrature with the first radio frequency signal, to produce a quadrature-phase modulated signal; and
a demodulator processor comprising:
a rate of change determiner configured to determine a combined rate of change of the in-phase and quadrature phase modulated signals, and
a determiner configured to compare the combined rate of change with at least one threshold to determine whether a logic state transition has occurred.

18. The near field RF communicator of claim 17, wherein the rate of change determiner comprises:
a first rate of change calculator configured to receive in-phase modulation derived from the in-phase modulated signal and to determine a rate of change of the in-phase modulation;
a second rate of change calculator configured to receive quadrature-phase modulation derived from the quadrature-phase modulated signal and to determine a rate of change of the quadrature-phase modulation; and
a combiner configured to combine the rate of change of the in-phase modulation and the rate of change of the quadrature-phase modulation to produce the combined rate of change.

19. The near field RF communicator of claim 18, wherein the combiner is further configured to determine the combined rate of change by performing at least one of:
adding the rate of change of the in-phase modulation and the rate of change of the quadrature-phase modulation;
scaling one of the rate of change of the in-phase modulation and the rate of change of the quadrature-phase modulation and adding the rate of change of the in-phase modulation and the rate of change of the quadrature-phase modulation; or
squaring the rate of change of the in-phase modulation and the rate of change of the quadrature-phase modulation to produced squared values, adding the squared values to produce a squared sum and determining a square root of the squared sum.

20. The near field RF communicator of claim 18, wherein the combiner is further configured to determine the combined rate of change by scaling a smallest one of the rate of change of the in-phase modulation and the rate of change of the quadrature-phase modulation and then adding the rate of change of the in-phase modulation and the rate of change of the quadrature-phase modulation.

21. The near field RF communicator of claim 18, wherein the first and second rate of change calculators are further configured to determine the rate of change of the in-phase modulation and the quadrature-phase modulation, respectively, based upon a level of a current sample of the in-phase modulation and the quadrature-phase modulation, respectively, and a level of one or more previous samples of the in-phase modulation and the quadrature-phase modulation, respectively.

22. The near field RF communicator of claim 17, wherein the determiner comprises:
   a threshold determiner configured to determine the at least one threshold based upon a rate of change in at least one of a positive and a negative peak in the combined rate of change.

23. The near field RF communicator of claim 17, wherein the determiner comprises:
   a threshold determiner configured to determine the at least one threshold based upon a rate of change in a positive peak in the combined rate of change multiplied by a scaling factor.

24. The near field RF communicator of claim 23, wherein the threshold determiner is further configured to determine a second threshold based upon the rate of change in the positive peak multiplied by a second smaller scaling factor and to determine that no change in a modulation level is occurring when the combined rate of change is less than the second threshold.

* * * * *

UNITED STATES PATENT AND TRADEMARK OFFICE
CERTIFICATE OF CORRECTION

| | | |
|---|---|---|
| PATENT NO. | : 7,986,916 B2 | |
| APPLICATION NO. | : 11/920788 | |
| DATED | : July 26, 2011 | |
| INVENTOR(S) | : Andrew Williams | |

It is certified that error appears in the above-identified patent and that said Letters Patent is hereby corrected as shown below:

In the Title Page, Item (54), please replace "DEMODULATION COMMUNICATION" With --DEMODULATION OF COMMUNICATION--.

Signed and Sealed this
Twenty-seventh Day of December, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,986,916 B2 | Page 1 of 1 |
| APPLICATION NO. | : 11/920788 | |
| DATED | : July 26, 2011 | |
| INVENTOR(S) | : Andrew Williams | |

It is certified that error appears in the above-identified patent and that said Letters Patent is hereby corrected as shown below:

Title Page, Item (54) and at Column 1, line 1, in the title, please replace "DEMODULATION COMMUNICATION" With --DEMODULATION OF COMMUNICATION--.

This certificate supersedes the Certificate of Correction issued December 27, 2011.

Signed and Sealed this
Thirty-first Day of January, 2012

David J. Kappos
*Director of the United States Patent and Trademark Office*